United States Patent [19]
McKenna

[11] Patent Number: 5,392,412
[45] Date of Patent: Feb. 21, 1995

[54] DATA COMMUNICATION CONTROLLER FOR USE WITH A SINGLE-PORT DATA PACKET BUFFER

[75] Inventor: James L. McKenna, Sayville, N.Y.

[73] Assignee: Standard Microsystems Corporation, Hauppauge, N.Y.

[21] Appl. No.: 770,695

[22] Filed: Oct. 3, 1991

[51] Int. Cl.⁶ ............... G06F 12/00; G06F 13/00; H04J 3/24
[52] U.S. Cl. ............... 395/425; 395/325; 395/200; 364/DIG. 1; 370/94.1; 370/85.9; 370/60
[58] Field of Search ......... 395/425, 200, 250, 400, 395/325; 370/85.1, 94.1, 60, 94.2, 85.9, 85.11

[56] References Cited

U.S. PATENT DOCUMENTS

| | | | |
|---|---|---|---|
| 4,604,683 | 8/1986 | Russ et al. | 395/325 |
| 4,967,398 | 10/1990 | Jamoua et al. | 365/230.05 |
| 5,016,248 | 5/1991 | Kudoh | 370/94.1 |
| 5,175,732 | 12/1992 | Hendel et al. | 370/94.1 |
| 5,193,149 | 3/1993 | Awiszio et al. | 395/200 |
| 5,210,749 | 5/1993 | Firoozmand | 370/94.1 |

Primary Examiner—Glenn Gossage
Attorney, Agent, or Firm—Hopgood, Califmafde, Kalil & Judlowe

[57] ABSTRACT

A data communication controller having a memory access control unit characterized by a symmetrical access port architecture. The memory access control unit allows both a host processor and the medium access control (MAC) unit of the data communication controller to transparently access a single-port data packet buffer memory while operating at full specified operating speed and without interference between simultaneous memory access requests. The memory access control unit arbitrates asynchronous memory access requests from both the host processor and the medium access control unit, while permitting each of these processors unlimited access to the single-port buffer memory as if it alone had the full memory available to itself at all times. The above capabilities are achieved using automatic address incrementation and data-byte prefetching operations, without requiring the use of a port processor or additional internal data buses.

3 Claims, 8 Drawing Sheets

DATA COMMUNICATION CONTROLLER FOR USE WITH A SINGLE-PORT DATA PACKET BUFFER

BACKGROUND OF THE INVENTION

1. Field of Invention

The present invention relates generally to a method and apparatus for providing two processors transparent access to a single-port memory storage device, such as a random access memory (RAM) storage device. Yet, more particularly, the present invention relates to such method and apparatus adapted for utilization in a communication controller interfaced between a host processor and the communication network.

2. Brief Description of the Prior Art

Local-area networks (LAN) are communication systems which enable data-processing devices, such as computer workstations, to communicate with each other through a communication (e.g. transmission) media. Data-processing devices in such networks are typically referred to as nodes or stations. While many such stations are likely to be relatively autonomous, requiring communication with other stations only occasionally, other stations may require more frequent communication. Typically, the amount of communication required by a particular station can vary from time to time.

In many local area networks, stations can be easily added to, removed from, and moved from place to place within the network. While there are numerous local area networks presently known, they can be classified into two general types. The first type of network is referred to as a "centralized network" which is characterized by the requirement of a centralized network controller which implements the network protocol. The second type of local area network is referred to as a "distributed network" which does not require a centralized network controller, and instead provides each station within the network with a communication controller having a medium access control (MAC) unit that locally implements the network protocol within each communication controller.

In a distributed local area network, packet switching is a technique commonly employed to dynamically allocate the communication resources of the network among multiple communicating stations. According to this technique, messages to be communicated between stations are partitioned (by the transmitting station's processor) into packets, having a fixed maximum size. The packets are then ascribed a station (i.e. source) identifier. The packets are then placed on the communication medium by the station's communication controller. Such packets are then sensed and selectively processed by the communication controller of the destination station in the network.

Any packet from one station to another station contains various fields of information specified in accordance with a predetermined network protocol. The information typically includes the identity of the source station, the identity of the destination station, and various other information concerning the characteristics of the packet. In some network protocols, a number of different types of packets may appear on the communication medium in accordance with the network protocol. Typically, these packets relate to either communication control or data-transfer functions.

To more fully appreciate the problems associated with conventional communication controllers used in the stations of distributed local-area-networks, reference is made to FIGS. 1 and 2.

In FIG. 1, a distributed local area-network 100 is shown, comprising a plurality of stations (i.e. nodes 102A through 102M) which are operably connected to a communication medium 103, such as a cable. In FIG. 2, each station is shown to generally comprise a host processor (e.g., central processing unit or CPU) 104, a program memory 105, a system memory 106, a communication controller 107, a system (i.e. CPU) bus 108, and a communication medium interface unit 109. The processor, program memory and system memory are each connected to a system bus 108, and the system bus, in turn, is connected to communication controller 107, as shown. The communication controller is connected to the communication medium 103 by way of the communication medium interface unit. Typically, the communication medium interface unit is suitably adapted for the particular characteristics of the communication medium being employed in the network.

In general, communications controllers, and LAN controllers in particular, are usually integrated into a system architecture and software environment by providing the means for supporting two independent data queues in software: a transmit queue and a receive queue. Each queue is associated with a process, namely, the transmit process and the receive process of the low-level software communications driver.

The transmit queue holds the elements that the software intends to transmit. In a packet-switched environment of a local area network, these elements are usually data packets that include a block of data to be transmitted and some associated information like the destination for the block of data. The receive queue holds the elements that the station has received, again usually packets containing a block of data and associated information identifying the sender of the data block.

Elements are added to the transmit queue by the software driver whenever the host processor needs to transmit information. Elements are removed from the transmit queue after successful transmission is assumed. Removal of these elements from the transmit queue can be done either by the low-level software driver or by the communications controller. Elements are added to the receive queue by the communications controller whenever a relevant data packet is received. Elements are removed from the receive queue by the low-level software driver upon processing the packet.

The transmit and receive queues that are managed by software in system memory, eventually meet the communication controller. The interface between the queues and the communication controller determines the behavior of the queues during the addition of receive elements and removal of transmit elements.

Management of the transmit and receive queue elements at the level of the communication controller has been attempted in a variety of ways.

One type of prior art communication controller employs queues for transmit and receive commands while storing corresponding data packets in a data packet buffer memory associated with the communication controller. Representative of this type of prior art is the 90C66 Communication Controller from Standard Microsystems of Hauppauge, N.Y.

Using an altogether different technique than the command queuing scheme described above, the prior art has sought to extend the transmit and receive data queues into the communication controller by simulating transmit and receive data queues in the data packet buffer memory of the communication controller. In general, there have been several different approaches to implementing this generalized memory management technique.

For example, according to one approach, many transmit and receive data elements can be managed as a "ring buffer," in which the data packet buffer memory is configured as a number of memory elements which can be sequentially allocated and accessed. Prior art representative of this approach includes the 8390 NIC Communication Controller from National Semiconductor Corporation, Santa Clara, Calif. and the Etherstar ® Ethernet Communications Controller from Fujitsu Corporation.

An alternative approach for simulating transmit and receive data queues at the communication controller level, involves linking together a disjointed array of memory storage locations using address pointers compiled in accordance with a "linked list". In order for the link-list communication controller to find the memory storage location where a packet begins, as well as the storage locations where each one of the buffers (comprising a packet) begins, the software driver must perform a number of computations. Prior art representative of the above type device includes the 82586 and 82596 Communication Controllers from Intel Corporation, Santa Clara, Calif.

Notably, despite the approach employed in simulating transmit and receive data queues at the communication controller level, both the host processor (i.e. CPU) and the medium access control (MAC) unit must write and/or read a "packet" of data into the data packet buffer memory associated with the communication controller. Such memory access operations involve movement of a byte of data at a time into or out of the data packet buffer memory, and typically a number of memory access operations are required for writing or reading a single data packet.

If the host processor wishes to transmit a data packet to a remote node in the network, it must access the data packet buffer memory and write a packet of data into a selected portion thereof. Then a transmit request or command is provided to the medium access controller instructing the medium access control unit where to transmit the buffered data packet when it is free to do so. When the medium access control unit is ready to transmit the buffered data packet, it accesses the data packet buffer memory and reads the buffered data packet therefrom and transmits the data packet over the communication medium to its destination.

Similarly, when a receive request is stored within the communication controller a remote node transmits a data packet to the host processor over the network communication medium, then the medium access control unit can receive the data packet, access the data packet buffer memory and write the received data packet into a selected portion thereof. Thereafter, the host processor is issued an interrupt to advise that a data packet has been buffered in the data packet buffer memory and is ready to be received by the host processor. When the host processor is free, it then accesses the data packet buffer memory, reads the received data packet out therefrom and places it into the data packet receive queue maintained in software.

Notably, the storage locations in the data packet buffer memory for each particular transmitted and received data packet can be predetermined, or dynamically assigned by the communication controller as needed. However, both the host processor and the medium access control unit must operate asychronously with respect to each other and the data packet buffer memory. Consequently, the host processor and the medium access control unit will naturally access the common data packet buffer memory in an asynchronous manner while either transmitting or receiving data packets. While a single-port data packet buffer memory is preferred in terms of cost and manufacture, simultaneous memory accesses by these asynchronous processors will cause contentions in time for memory access through the single port, typically resulting in loss of data and time.

While a dual-port data packet buffer memory obviates memory contention problems, this approach is often undesirable over a single port structure for economic and manufacturing considerations.

Thus, there is a great need in the art for a way to provide the host processor and medium access control unit transparent access to a single-port data packet buffer memory operably associated therewith.

OBJECTS AND SUMMARY OF THE PRESENT INVENTION

Accordingly, it is a primary object of the present invention to provide a method and apparatus which permits two memory accessing processors, such as the host processor and medium access control unit of a communication controller, to transparently access a single-port memory storage device associated with the communication controller.

It is a further object to provide such a method and apparatus in the form of a synchronous memory access control circuit within a communication controller having a single-port RAM data packet buffer memory. In the illustrated embodiment, the communication controller with the single-port RAM buffer memory and the memory access control circuit are all implemented on a single semiconductor integrated circuit (IC) chip. In operation, the memory access control circuit allows both the host processor and the medium access control unit to access the single-port memory buffer while operating at full specified operating speed, and without interference between simultaneous memory access requests. The memory access control circuit arbitrates asynchronous memory access requests from both the host processor and the medium access control unit, while permitting each of these processors unlimited access to the single-port buffer memory as if it alone had the full memory available to itself at all times. As a result, the single port buffer memory appears to be of a dual-port design while physically a single-port structure.

Another object of the present invention is to provide such a synchronous memory access control circuit, in which memory storage locations for data bytes to be stored are indirectly accessed by the host processor and the medium access control unit, or the address generating unit acting on behalf of the memory accessing processor. In this way, when buffering each data packet byte into the data packet buffer memory, the host processor or the medium access control unit need only provide to a designated port in the memory access control circuit, (i) the data byte to be stored, (ii) the selected address of the corresponding memory storage location, and (iii) a memory write request. Then, whenever the host processor or the medium access control unit returns to the memory access control circuit to write another data byte into the single-port buffer memory, the previous memory write request will always be executed.

Similarly, when retrieving each data packet byte stored in the data packet buffer memory, the host processor or the medium access control unit need only ensure that a memory read request and the address of the memory storage location of the data byte, be provided to a designated port in the memory access control unit. Then, whenever the host processor or the medium access control unit returns to the memory access control circuit to read another data byte out of the data packet buffer memory, the next data byte within the retrieved data packet will have been prefetched from the data packet buffer memory and buffered at the designated port for instantaneous reading.

When either writing or reading a number of consecutively stored data packet bytes into or out of the data packet buffer memory, the host processor or the medium access control unit need only write into the port of the memory access control unit the data packet memory address of the first data byte, and thereafter write or read the first data byte. For each consecutive data byte to be written into or read from the data packet buffer memory, the memory access control unit will automatically generate the next address, and if a memory read request has been made, automatically prefetches the corresponding data byte and buffers it at the respective port for reading.

These and other objects of the present invention will become apparent hereinafter.

BRIEF DESCRIPTION OF THE DRAWINGS

For a more complete understanding of the present invention, the detailed description of the illustrated embodiment is to be taken in connection with the following drawings, in which.

DETAILED DESCRIPTION OF THE ILLUSTRATIVE EMBODIMENT OF THE PRESENT INVENTION

Figure 1:
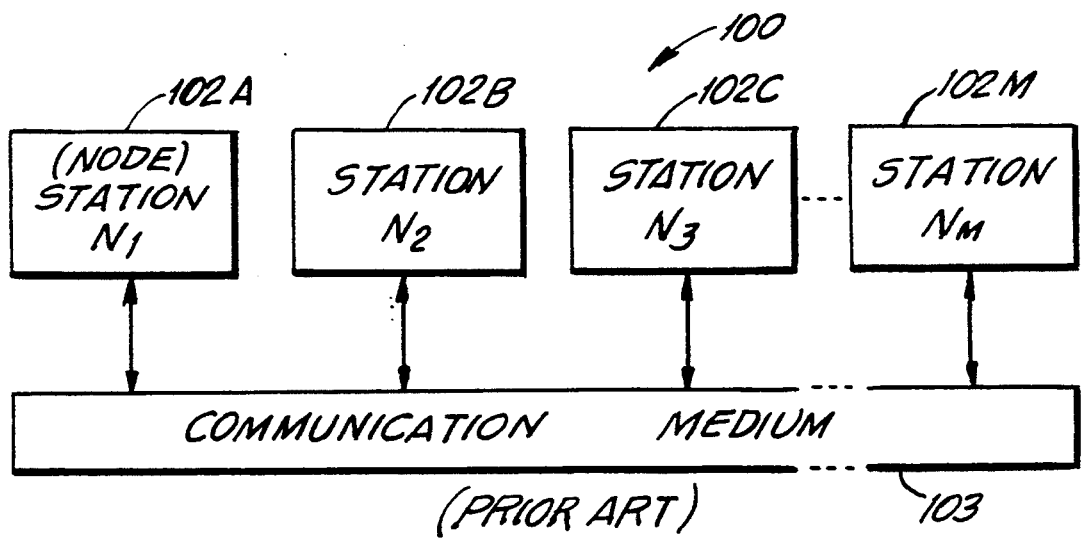
FIG. 1 is a schematic representation of a local area network system permitting a plurality of stations to access to a shared communication medium allocated in accordance with a network protocol.
Figure 2:
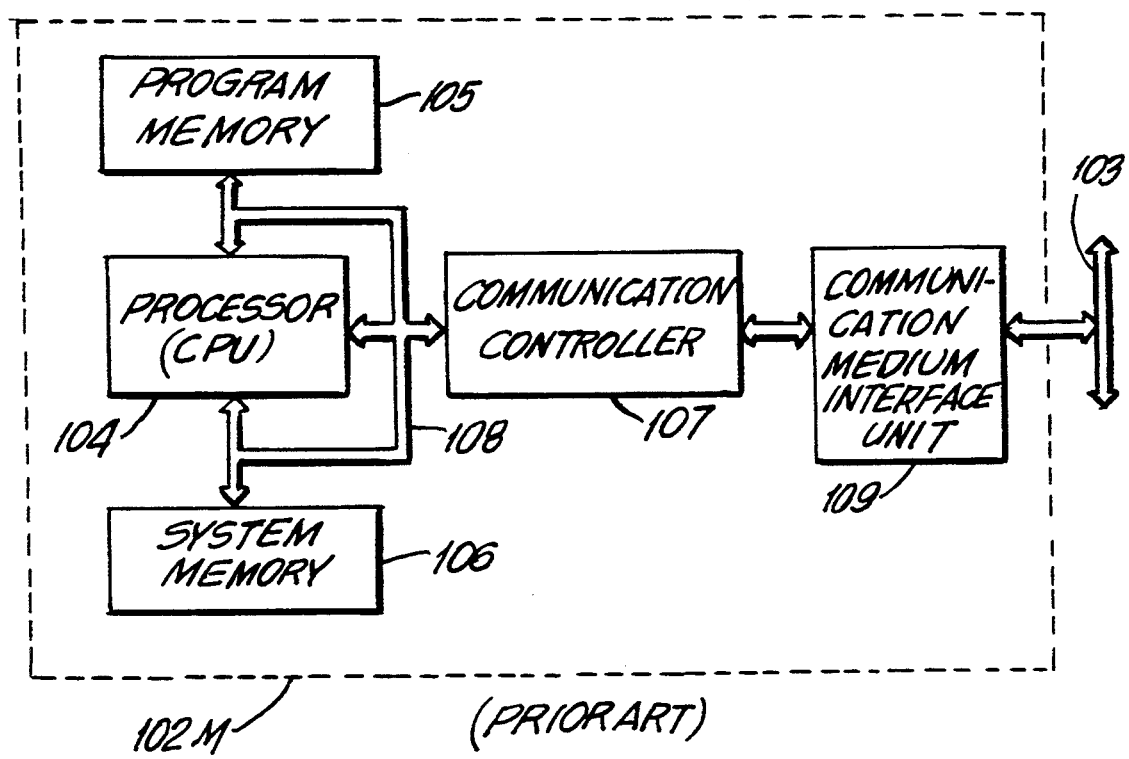
FIG. 2 is a block functional diagram of a prior art station within the local area network of FIG. 1, showing the major components of the station.
Figure 3:
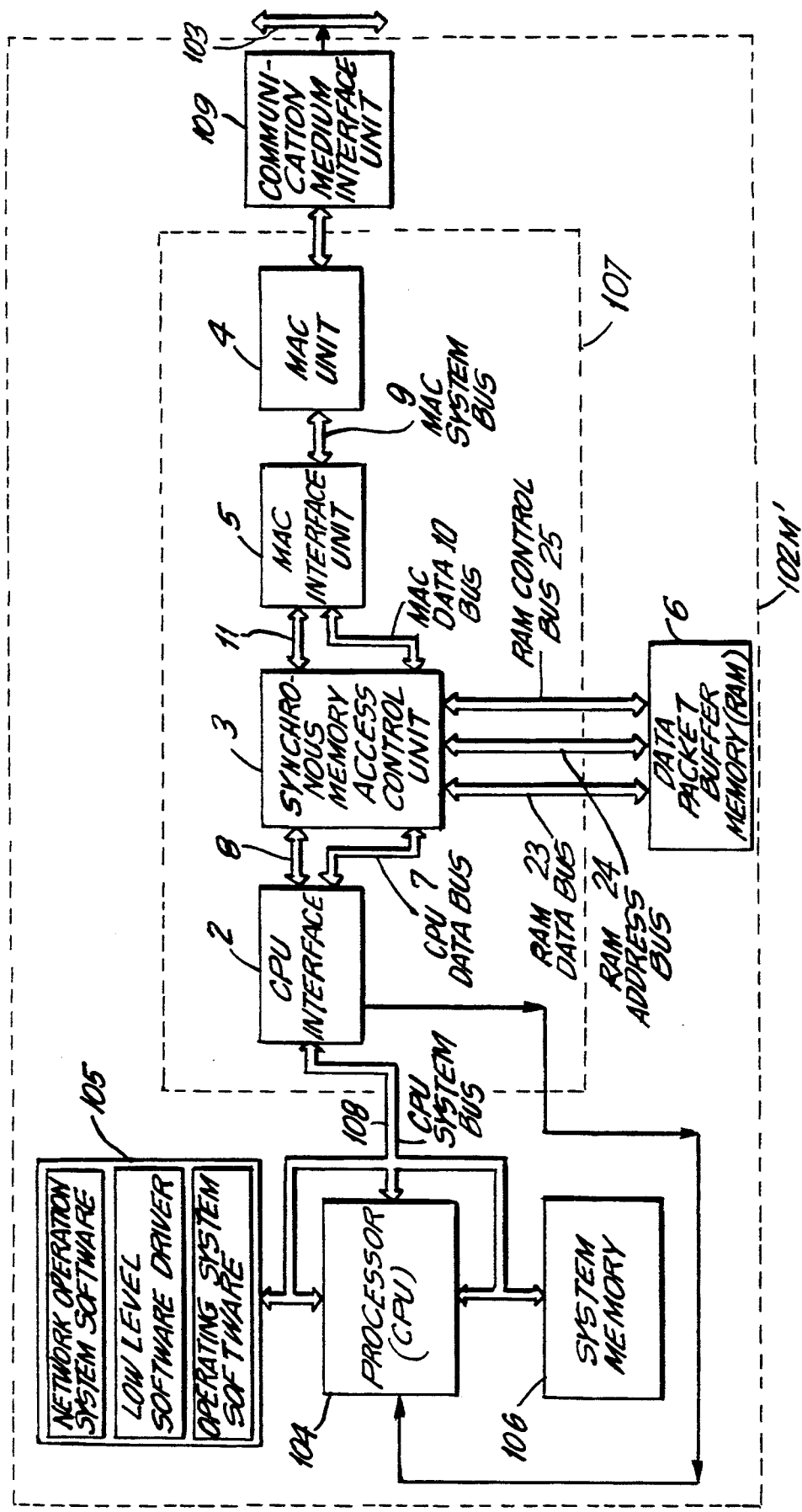
FIG. 3 is a block functional diagram of a station provided with a communication controller according to the present invention, showing functional subunits of the communication controller arranged with the synchronous memory access control unit of the present invention.
Figure 4:
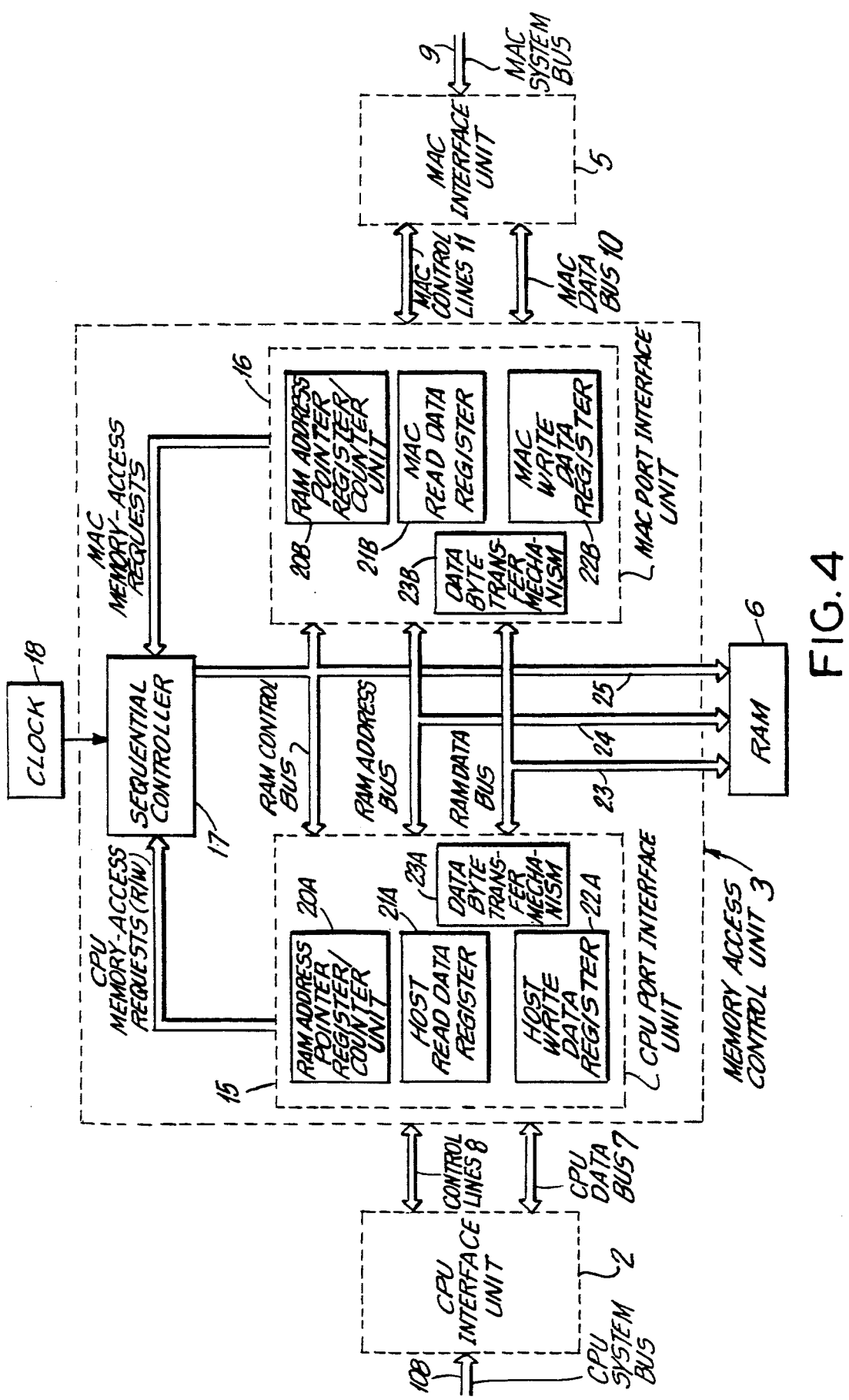
FIG. 4 is a high-level schematic representation of the synchronous memory access control unit of the present invention, illustrating the major components thereof and the general data, address and control flow between the memory access control unit, the host processor, the medium access control unit and the data packet buffer memory.

Referring to FIG. 3, the communication controller of the present invention is illustrated. In general, communication controller 109 comprises CPU interface unit 2, synchronous memory access control unit 3, medium access control (MAC) unit 4, and MAC interface unit 5. Associated with the controller is a data packet buffer memory 6, realized in the illustrative embodiment as a single-port static randomly accessible memory (RAM) storage device, well known in the art. The access time of RAM buffer memory 6 will be referred to hereinafter as $T_{mem\ access}$. As shown, CPU data bus 7 and control lines 8 interface CPU interface unit 2 with synchronous memory access control unit 3, whereas MAC data bus 10 and MAC control lines 11 interface MAC interface unit 5 with memory access control unit 3. RAM data bus 12, RAM address bus 13 and RAM control bus 14 interface RAM buffer memory 6 with memory access control unit 3. As illustrated in FIG. 4, memory access control unit 3 comprises CPU port interface unit 15, MAC port interface unit 16, and sequential controller 17. As shown, CPU interface unit 2 is interfaced with CPU port interface unit 15 by way of CPU data bus 7 and CPU control lines 8, whereas MAC interface unit 5 is interfaced with MAC port interface unit 16 by way of MAC data bus 10 and MAC control lines 11. An external clock 18 having a clock pulse frequency $F_{clock}=1/T_{clock}$ is provided to the sequential controller to provide a periodic time base for synchronous operation of the memory access control unit. Although $T_{clock}$ is 50 nanoseconds in the illustrative embodiment, is understood that this clock period will typically vary from embodiment to embodiment.

Figure 5:
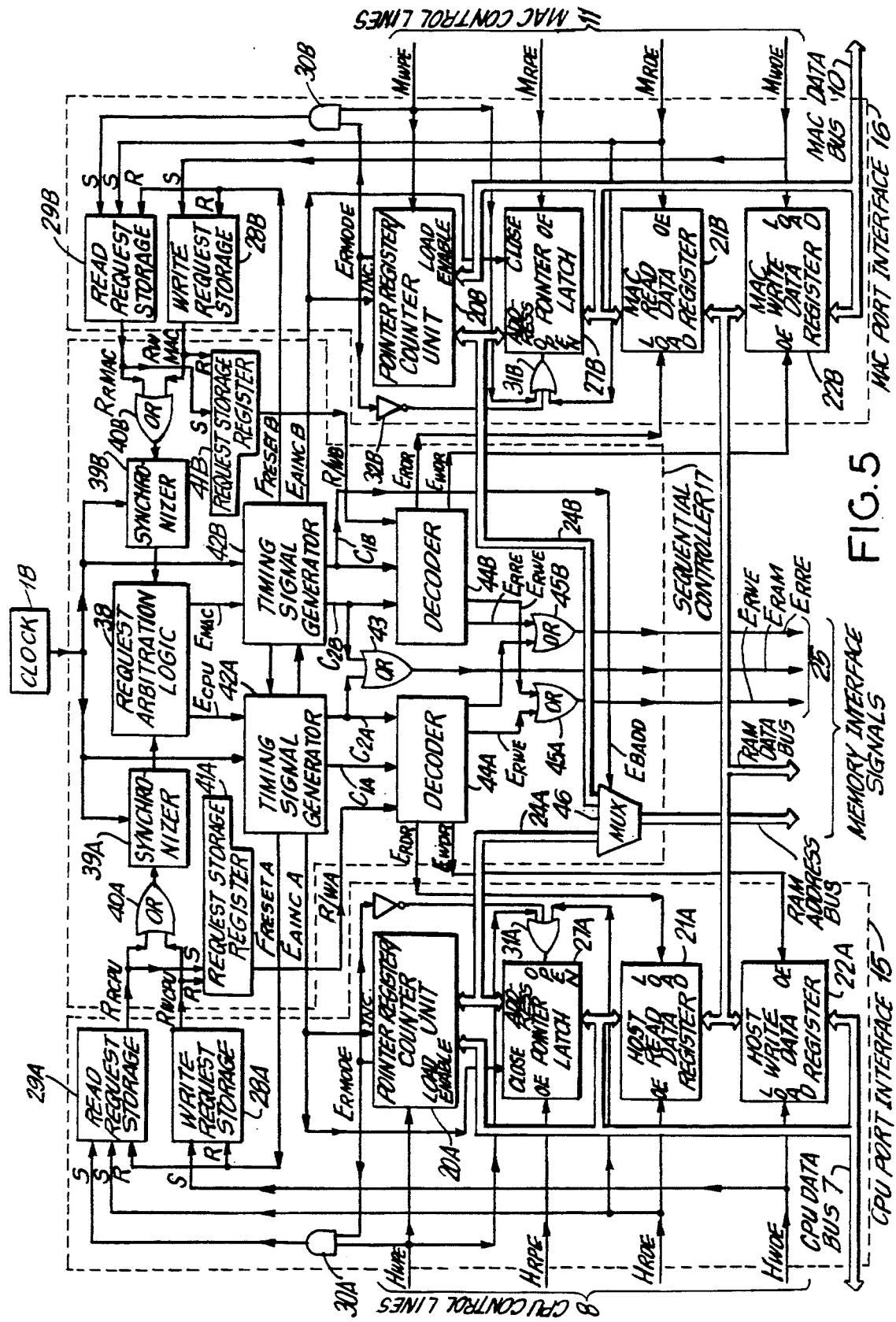
FIG. 5 is a low-level schematic diagram of the synchronous memory access control unit of the present invention.

As shown in FIGS. 4 and 5, memory access requests $R_{WCPU}$ and $R_{RCPU}$ are issued by the host processor (i.e. CPU) and are provided from CPU port interface unit 15. In turn, these requests are provided to sequential controller 17 for servicing. Similarly, memory access requests $R_{WMAC}$ and $R_{RMAC}$ are issued by the medium access control unit and are provided from MAC port interface unit 16. In turn, these requests are provided to sequential controller 17 for servicing. The manner in which these four requests are serviced will be described in great detail hereinafter. While memory access requests may be simultaneously presented to memory access control unit 3 by both host processor 104 and medium access control unit 4, memory access contentions will never occur for reasons which will hereinafter become apparent.

CPU interface unit 2 generally comprises logic circuitry suitable for interfacing the data and control lines of host system bus 108 with CPU port interface unit 15. Part of such logic circuitry will include decoding circuitry, in which digital signals on system address and control lines are processed to produce control lines 8, provided to CPU port interface unit 16. Similarly, MAC interface unit 5 generally comprises logic circuitry suitable for interfacing the address, data and control lines of MAC system bus 9 with MAC port interface unit 16. Part of such circuitry will also include decoding circuitry, in which digital signals on MAC system address and control lines are processed to produce control lines 11, provided to MAC port interface unit 16. The function of control lines 8 and 11 will be described in greater detail hereinafter.

As illustrated in FIG. 4, CPU port interface unit 15 comprises RAM address pointer register/counter unit 20A, host read data register 21A, host write data register 22A and a data byte transfer mechanism mechanism 23A. In a symmetrical fashion, MAC port interface unit 16 comprises RAM address pointer register/counter unit 20B, MAC read data register 21B, MAC write data register 22B, and a data byte transfer mechanism 23B. In the illustrative embodiment where each data byte is an eight bit word, the length of each register 21A, 21B, 22A, and 22B is eight bits, although it is understood that this length can and will typically vary from embodiment to embodiment. The bit length of RAM address registers 20A and 20B will be set by the number of byte storage locations afforded by RAM buffer memory 6.

In accordance with the present invention, neither the host processor nor the medium access control unit directly access the data packet storage buffer 6. Instead, the host processor and the medium access control unit are constrained to indirect accessing of data packet storage buffer 6 by either writing data bytes into or reading data bytes from their respective port interface units. As will be described in greater detail hereinafter with reference to FIGS. 5 and 6, this involves writing the RAM address into the pointer register/counter unit 20A or 20B. Then, after waiting for at least two memory access cycles (i.e. $2 \cdot T_{mem\ access\ cycle}$ seconds) to occur in memory access control unit 3, the respective port interface unit is once again accessed and a corresponding data byte is either written into the write data register or the corresponding data byte is read out of the read data register in the respective port interface unit. Thereafter, the memory access request is executed in a synchronous manner within the $2 \cdot T_{mem\ access\ cycle}$ second time period. During the execution of memory access cycles, RAM data, address and control buses 23, 24 and 25 are used to effect addressing and data transfers between RAM buffer memory 6 and port interface units 15 and 16. When the host processor or medium access control unit returns with another memory access request, the previously placed request will have been automatically executed without delay. Thus, by satisfy-ing system constraint $T_{port\ access} \geq 2 \cdot T_{mem\ access\ cycle}$, memory access control unit 3 guarantees that both the host processor and the medium access control unit are provided collision-free access to RAM buffer memory 6.

In order to appreciate the function and capabilities of pointer register/counter units 20A, 20B and mechanisms 23A, 23B, a brief description of the operation of memory access control circuit 3 during both the read and write modes of RAM access will be provided below with reference to FIG. 4 in particular.

When the host processor desires to write a data byte into RAM buffer memory 6, the host processor writes the RAM address of the data byte into RAM address pointer register/counter unit 20A. Then, after waiting at least the $2 \cdot T_{mem\ access\ cycle}$ second time period, the host processor places the corresponding data byte onto CPU data bus 7, and then writes the data byte into host write data register 22A of the CPU port interface unit. In a synchronous manner, sequential controller 17 detects the RAM write request $R_{WCPU}$ during the next memory access time window created by the sequential controller, and completely executes the request within two clock pulse periods (i.e. $2 \cdot T_{clock}$).

The memory 6 access request $R_{WCPU}$ is generally carried out by the following controlled sequence of operations. First, the address in pointer register/counter unit 20A is provided to RAM buffer memory 6 by way of RAM address bus 24. Then RAM enable signals are generated by the sequential controller and provided to RAM buffer memory 6, to transfer the data byte in host write data register 22A over data bus 23 and into the addressed storage location in buffer memory 6. If the host processor selected automatic address incrementing at the time of writing the previous address into pointer register/counter unit 20A, then the RAM address value in this register will be incremented to the next consecutive address value, corresponding to the next data byte within the data packet being transmitted. Then when the host processor returns to the CPU port interface unit to write the next data byte into host write data byte register 22A, the corresponding address value will have been automatically loaded into pointer register/counter unit 20A. The sequential controller, sensing (i.e. detecting) once again memory access request $R_{WCPU}$, automatically executes memory access request $R_{WCPU}$ during the next memory access cycle, as described above.

When the host processor desires to read a data byte from RAM buffer memory 6, the host processor writes the corresponding RAM address into pointer register/counter unit 20A. Then after $2 \cdot T_{mem\ access\ cycle}$ seconds when the host processor reads host read data register 21A, the addressed data byte will have been automatically read from buffer memory 6 and preloaded into host read data register 21A (i.e. data byte prefetching). This automatic prefetching of the addressed data byte is achieved by data byte transfer mechanism 23A carried out by the sequential controller and occurs automatically during the awaited time period of $2 \cdot T_{mem\ access\ cycle}$. The reading of the addressed data byte from buffer memory 6 is generally carried out as follows. First, the address in pointer register/counter unit 20A is provided to RAM buffer memory 6 by way of address bus 24. Then RAM enable signals are generated by the sequential controller and provided to RAM buffer memory 6 so as to transfer the data byte stored in the addressed storage location over RAM data bus 23, and into host read data register 21A of the CPU port interface unit.

If the host processor selected automatic address incrementation at the time of writing the previous address into pointer register/counter unit 20A, then after carrying out the data byte prefetching operation, the RAM address value in the pointer register/counter unit 20A will be automatically incremented to the next consecutive address value, which corresponds to the next data byte within the data packet being retrieved from RAM buffer memory 6. Then when the host processor returns to the CPU port interface unit after $2 \cdot T_{mem\ access\ cycle}$ seconds or later, the next data byte in the packet will have been automatically preloaded into read data register 22A, for reading by the host processor.

The RAM write and read operations described above in connection with the host processor occur in identically the same manner for the medium access control unit, as the structure and function of MAC port interface unit 16 is similar to the structure and function of CPU port interface unit 15.

Figure 6:
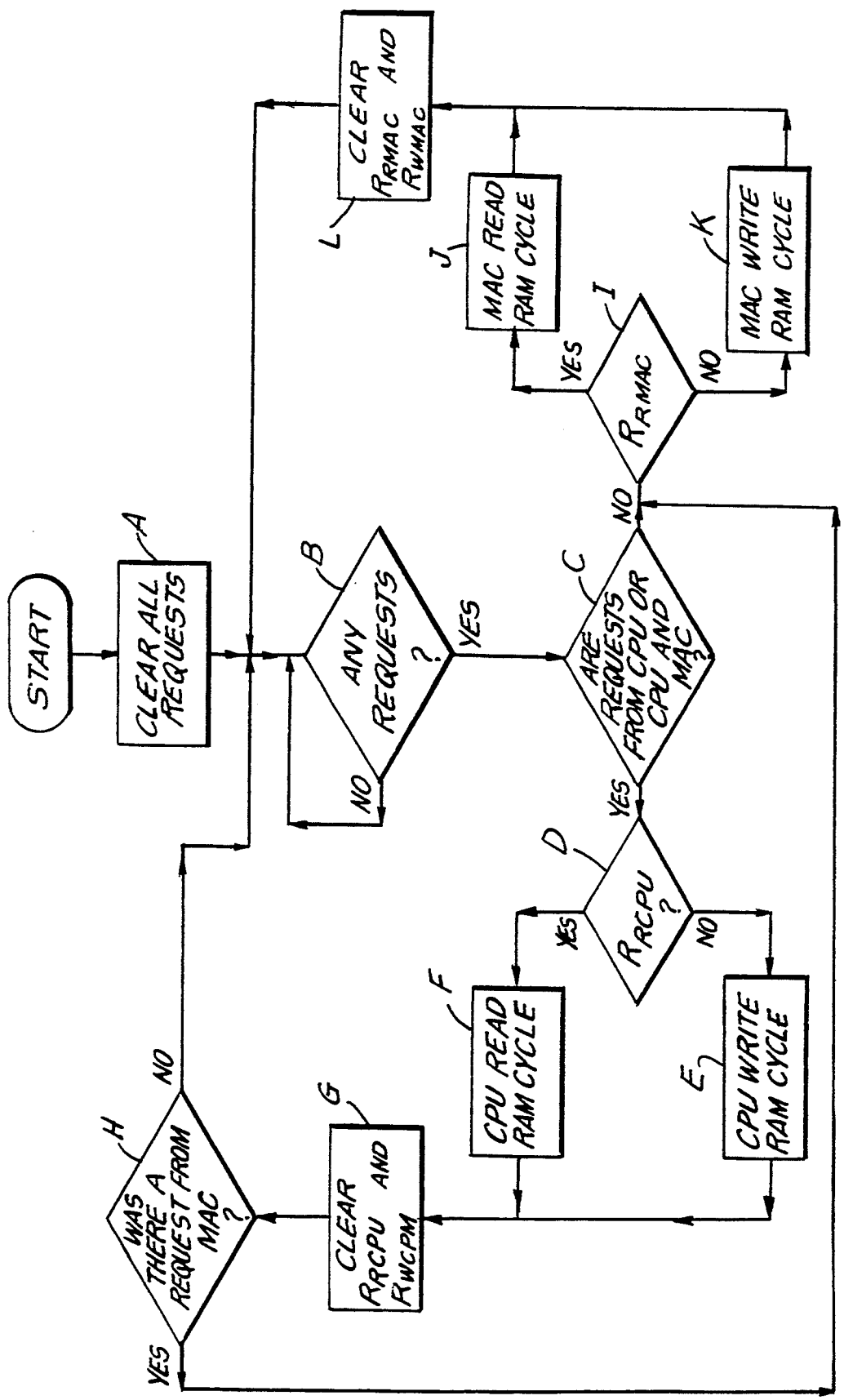
FIG. 6 is a high level flow chart illustrating arbitration of memory access requests from the host processor and the medium access control unit, and the general control flow carried out by the sequential controller in the memory access control unit of the illustrative embodiment.

Having described the structure and operation of the memory access control unit at a high level of representation afforded by FIG. 4, a detailed description thereof will now be provided with reference to FIGS. 5 and 6.

As illustrated in FIG. 5, CPU port interface unit 15 comprises an arrangement of components, namely RAM address pointer register/counter unit 20A, host read data register 21A, host write data register 22A, address pointer latch 27A, write request storage element 28A, read request storage element 29A, AND gate 30A, OR gate 31A and inverter 32A. The structure and function of each of these components will be described below.

Figure 5A:
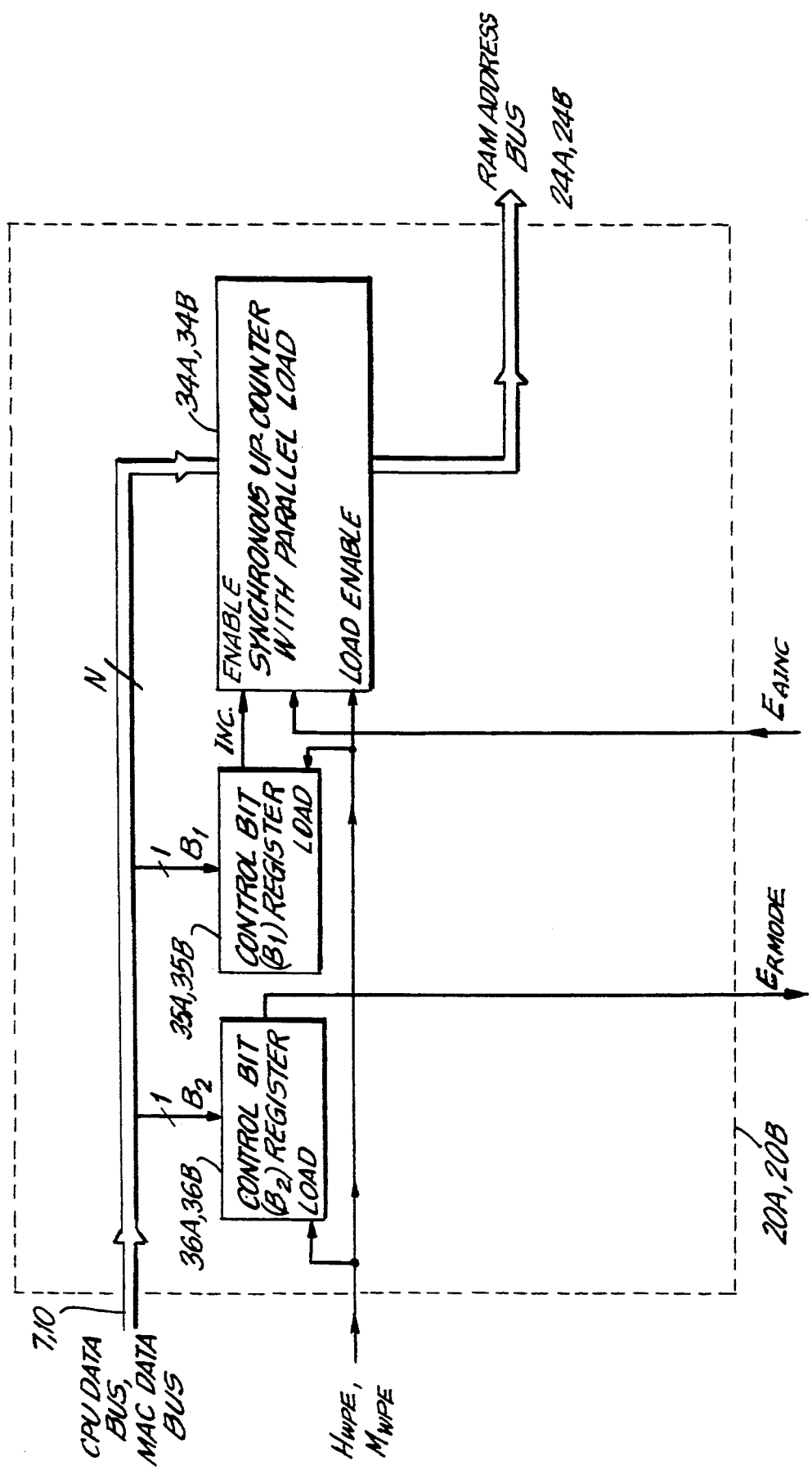
FIG. 5A is a block functional diagram of the address pointer register/counter unit employed in each of the port interface units shown in FIG. 5.

As shown in FIG. 5A, pointer register/counter unit 20A comprises an address pointer register 34A, a first control bit register 35A and a second control bit register 36A configured as shown. N lines of CPU data bus 7 are connected to the input of address pointer register 34A for transfer of RAM address bits. Also, one line of data bus 7 is connected to the input of first control bit register 35A for transfer of a first control bit, $B_1$, which in the illustrated embodiment functions to indicate selection of automatic address incrementation. Also shown, another line of data bus 7 is connected to the input of second control bit register 36A for transfer of a second control bit, $B_2$, which in the illustrated embodiment functions to indicate selection of the RAM read mode, or the RAM write mode. Arbitrarily, $B_2=1$ indicates selection of the RAM read mode.

As illustrated in FIG. 5A, write pointer enable line $H_{WPE}$ is provided to the data load input of address pointer register 34A to enable the loading of RAM address for buffering as shown. Automatic address increment bit $B_1$ is provided to the "auto increment enable" input of address pointer register/counter 34A. As shown, an address increment enable line $E_{AINC}$ from the sequential controller is provided to the "counter increment" (i.e. clock) input of address pointer register 34A. The output of address pointer register 34A is connected to RAM address bus 24A. Read mode enable line $E_{RMODE}$ from the output of control bit register 36A is provided to the second input of AND gate 30A and also to the input of inverter 32A, as described above.

As illustrated in FIG. 5, CPU control lines 8 comprise write pointer enable (i.e. strobe) line $H_{RPE}$, read pointer enable line $H_{RPE}$, read data enable lines $H_{RDE}$, and write data enable line $H_{WDE}$. As described hereinabove, these lines emanate from an address decoder within CPU interface unit 2 and convey strobe signals provided by the host processor or by an address management unit operating under the direction or on behalf of the host processor. Specifically, write pointer enable line $H_{WPE}$ is provided to the "load enable" input of pointer register/counter unit 20A. As shown, line $H_{WPE}$ is also provided to the input of AND gate 30A and to the input of OR gate 31A. The output of AND gate 30A is provided to a first "flag set" input of read request storage element 29A, which can be realized as a flip flop circuit. The output of read request storage element 29A, in turn, reflects whether a RAM read cycle request $R_{RCPU}$ has been made by the host processor (i.e. CPU). Also as shown, the output of OR gate 31A is provided to the "open" control input of address pointer latch 27A to selectively open the same in response to the presence of the first occurrence of a high level signal at the open control input after the address pointer latch has been closed. The read mode enable line $E_{RMODE}$ from pointer register/counter unit 20A, is provided to the second input of AND gate 30A, and also to the input of inverter 32A, with the Output thereof provided to a second input of OR gate 31A.

As illustrated, read pointer enable line $H_{RPE}$ is provided to the "output enable" input of address pointer latch 27A. When line $H_{RPE}$ is strobed, the contents of address latch 27A may be read by the host processor over CPU data bus 7. Read data enable line $H_{RDE}$ is provided to the "output enable" input of host read data register 21A for enabling the reading of a data byte stored therein by the automatic byte prefetching mechanism, to be described hereinafter. As shown, read data enable line $H_{RDE}$ is provided to the third input of OR gate 31A, and also to a second set request input of read request storage element 29A. The write data enable line $H_{WDE}$ is provided to the "load enable" input of host write data register 22A, and also to the "request-set" input of write request storage element 28A which can also be realized by a flip flop circuit. Notably, the output of write request storage element 28A reflects whether a RAM write cycle request $R_{WCPU}$ has been made by the host processor.

The structure of MAC port interface unit 16 is identical to the CPU port interface unit as described above. For example, MAC port interface unit 16 comprises an arrangement of components, namely RAM address pointer register/counter unit 20B, host read data register 21B, host write data register 22B, address pointer latch 27B, write register storage element 28B, read request storage element 29B, AND gate 30B, OR gate 31B and inverter 32B.

As shown in FIG. 5A, pointer register/counter unit 20B comprises an address pointer register 34B, a first control bit register 35B and a second control bit register 36B operably configured in a manner identical to pointer register/counter unit 20A described above. As with CPU port interface unit 15, an automatic address increment bit $B_1$ and a read mode select bit $B_2$ are provided over separate lines of MAC data bus 10 to the data input port of control bit registers 35B and 36B, respectively, while RAM address bits are transferred to the data input of address pointer register 34B. Write pointer enable line $M_{WPE}$ is provided to the data load enable input of address register/counter 34B to enable the transfer of RAM address and control bits thereinto for buffering as shown. Automatic address increment bit $B_1$ is provided to the "auto increment enable" input of address pointer register/counter 34B. As shown, an address increment enable line $E_{AINC}$ from the sequential controller is connected to the "address increment" input of address pointer register/counter 34B, for incrementing the RAM address pointer in register/counter 34B in response to signals provided from the sequential controller. The output of RAM address pointer register 34B is connected to RAM address bus 24A. Read mode enable line $E_{RMODE}$ from the output of control bit register 35 is provided to the second input of AND gate 30B and also to the input of inverter 32B.

As illustrated in FIG. 5, MAC control lines 11 comprise write pointer enable line $M_{WPE}$ read pointer enable line $M_{RPE}$, read data enable line $M_{RDE}$ and write data enable line $M_{WDE}$. As described hereinabove, these lines emanate from a decoder within MAC interface unit 5 and convey strobe signals provided by the medium address control unit or an address management unit operating under the direction or on behalf of the medium access control unit. Specifically, write pointer enable line $M_{WPE}$ is provided to the "load enable" input of address pointer register/counter unit 20B. As shown, line $M_{WPE}$ is also provided to a first input of AND gate 30B and to a first input of OR gate 31B. The output of AND gate 30B is provided to a first "request-set" input of read request storage element 29B, which can be realized as a flip flop circuit. The output of read request storage element 29B, in turn, reflects whether a RAM read cycle request $R_{RMAC}$ has been made by the medium access control unit. Also as shown, the output of OR gate 31B is provided to the "open" control input of address pointer latch 27B to selectively open the same in response to the presence of the first occurrence of a high level signal at the open control input after the address pointer latch has been closed. The read mode enable line $E_{RMODE}$ from pointer register/counter unit 20B, is provided to the second input of AND gate 30B, and also to the input of inverter 32B, with the output thereof provided to the second input of OR gate 31B.

As illustrated, read pointer enable line $M_{RPE}$ is provided to the output enable input of address pointer latch 27B. When line $M_{RDE}$ is strobed, the contents of address latch 27B may be read to the medium access control unit over MAC data bus 10. Read data enable line $M_{RDE}$ is provided to the "output enable" input of MAC read data register 21B for enabling the reading of a data byte stored therein by the automatic data byte prefetching mechanism, to be described hereinafter. As shown, read data enable line $M_{RDE}$ is also provided to the third input of OR gate 31B, and also to a second "set-request" input of read request storage element 29B. The write data enable line $M_{WDE}$ is provided to the "load" input of host write data register 22B, and also to the "request-set" input of write request storage element 28A, which can also be realized by a flip flop circuit. Notably, the output of write request storage element 28B reflects whether a RAM write cycle request $R_{WMAC}$ has been made by the medium access control unit.

As illustrated in FIG. 5, sequential controller 17 also comprises a number of subcomponents, namely request arbitration logic 38, time-slot synchronizers 39A and 39B, OR gates 40A and 40B, request storage registers 41A and 41B, timing signal generators 42A and 42B, OR gate 43, decoders 44A and 44B, OR gates 45A and 45B, and RAM address multiplexer 46. The structure and function of these components will be described below.

Figures 7A, 7B:
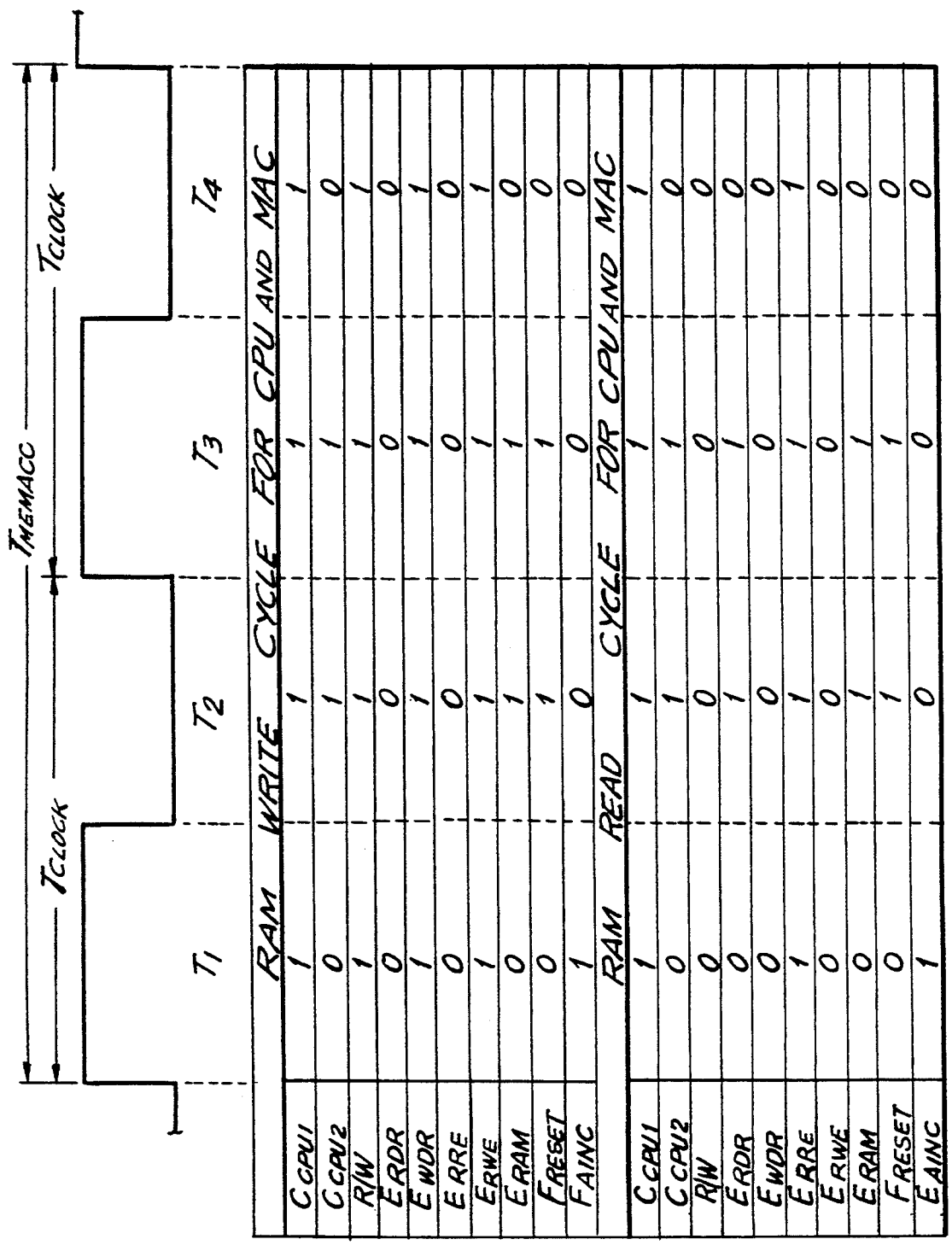
FIG. 7A is a schematic representation illustrating four consecutive clock half pulses generated by the external clock provided to the memory access control unit during each memory (i.e. RAM) access cycle carried out therein.
FIG. 7B is a table which shows the binary values of the timing control and mode status signals provided to the CPU and MAC decoders, for each of the four time intervals occurring during the RAM write and read cycles, and the binary values of the various enable signals provided to the port interface units and the RAM buffer memory.

As shown in FIGS. 5 and 7A, external clock 18 generates clock pulses having a half period of $\frac{1}{2} \cdot T_{clock}$ seconds, and a full clock period of $T_{clock}$ seconds. In the illustrative embodiment, the time period $T_{clock}$ is about 50 nanoseconds. This periodic clock signal is provided to time-slot synchronizers 39A and 39B, as well as timing control signal generators 42A and 42B, as shown. Synchronizers 39A and 39B, realizable as a combination of flip flop circuits, create time slots or "windows" through which request arbitration logic unit 38 can sense, via OR gates 40A and 40B, whether at least one of the request storage elements 28A, 28B and/or 29A, 29B contains a request. In this way, request arbitration logic 38 is capable of determining whether a memory access request has been made by the host processor and/or the medium access control unit. As will be described in greater detail hereinafter, each "time slot" created by synchronizers 39A and 39B occurs periodically at the beginning of each new clock period $nT_{clock}$ as illustrated in FIG. 8.

In order to obtain RAM write cycle request $R_{WCPU}$ or RAM read cycle request $R_{RCPU}$ for use by decoders 44A and 44B during the duration of each memory access cycle (i.e. $T_{mem\ access\ cycle}$), the output of read request storage element 29A is provided to the "request-set" input of request storage element 41A, realized in the illustrative embodiment as a toggle circuit. The output of the write request storage element 28A is provided to the "reset" input of request storage element 41A. The output of request storage element 41A is either RAM read cycle request $R_{RCPU}$ or RAM write cycle request $R_{WCPU}$, and is provided to decoder 44A by way of read/write line, $R/W_A$. If request storage unit 41A contains RAM read cycle request $R_{RCPU}$, then the signal level on line $R/W_A$ will be a logical "1", whereas the signal level will be a logical "0" if request storage element 41A contains RAM write request $R_{WCPU}$.

Similarly, to retain RAM write cycle request $R_{WMAC}$ or RAM read cycle request $R_{RMAC}$ for use by decoder 44B during the duration of each memory access cycle, output of read request storage element 29B is provided to the "request-set" input of request storage element 41B, also realized in the illustrative embodiment as a toggle circuit. The output of the write request storage element 28B is provided to the "reset" input of request storage element 41B. The output of request storage element 41B is either RAM read cycle request $R_{RMAC}$ or RAM write cycle request $R_{WMAC}$, and is provided to decoder 44B by way of read/write line, $R/W_B$. If request storage unit 41B contains RAM read cycle request $R_{RMAC}$, then the signal level on line $R/W_B$ will be a logical "1", whereas the signal level will be a logical "0" if request storage element 41B contains RAM write request cycle $R_{WMAC}$.

As illustrated in FIG. 5, request arbitration logic 38 determines whether any memory access requests have been made within each time slot created by synchronizers 39A and 39B. If only a memory access request has been made by the host processor, then this condition is indicated by providing enable signal $E_{CPU}=1$ to timing control signal generator 42A. In response, operation of timing control signal generator 42A is enabled, and will remain enabled for the next four half clock cycles, i.e. $2 \cdot T_{clock}$ seconds as illustrated in FIG. 7A. Timing control signals produced from timing control signal generator 42A during the four half clock cycle time period, depend solely on time intervals $T_1$, $T_2$, $T_3$, $T_4$. As shown, timing control signal generator 42A generates the following signals: (i) timing control signals $C_{1A}$ and $C_{2B}$ which are provided to decoder 44A; (ii) request flag reset signal $F_{RESETA}$ which is provided to the reset input of read and write request storage elements 29A and 28A; and (iii) address increment enable signal $E_{AINCA}$ which is provided to the increment input of address pointer register/counter 20A and to the "close" input of address pointer latch 27A. Also, timing control signal $C_{2A}$ is provided to a first input of OR gate 43 which provides as an output, the RAM enable signal $E_{RAM}$ to RAM buffer memory 6.

The function of request arbitration logic 38 and timing control signal generator 42B for memory access requests made by the medium access control unit is similar to the function of request arbitration logic 38 and timing control signal generator 42A for memory access requests made by the host processor. For example, if only a memory access request has been made by the medium access control unit, then this condition is indicated by providing enable signal $E_{MAC}=1$ to timing control signal generator 42B. In response, operation of timing control signal generator 42B is enabled, and will remain enabled for the next four half clock cycles, i.e. $2 \cdot T_{clock}$ seconds as illustrated in FIG. 7A. Timing control signals produced from timing control signal generator 42B during the four half clock cycle time period, depend solely on the time intervals $T_1$, $T_2$, $T_3$ or $T_4$. As shown, timing control signal generator 42B generates the following binary level signals: (i) timing control signals $C_{1B}$ and $C_{2B}$ which are provided to decoder 44B; (ii) request flag reset signal $F_{RESETB}$ which is provided to the reset input of read and write request storage elements 29B and 28B; and (iii) address increment enable signal $E_{AINCB}$ which is provided to the increment input of pointer register counter 20B and to the "close" input of address pointer latch 27B.

If, however, a memory access request is made by both the host processor and the medium access control unit during the same time slot or window created by synchronizers 38A and 38B, then as illustrated in blocks C and D of the flow chart of FIG. 6, the host processor request is accorded priority while the request placed by the MAC unit must wait one memory access cycle time period $T_{mem\ access\ cycle}$ for execution. Notably, however, as long as the port access time $T_{CPU\ port\ access}$ of the host processor and the port access time $T_{MAC\ port\ access}$ of the medium access control unit are greater than or equal to $2 \cdot T_{mem\ access\ cycle}$, then both the host processor and the medium access control unit will be guaranteed transparent, collision-free access to RAM buffer memory 6. Also, the fact that host processor requests have been accorded priority over those of the medium access control unit, is purely arbitrary. Instead, memory access requests made by the medium access control unit can be accorded priority over those of the host processor with equivalent performance obtained by the memory access control unit of the present invention.

As illustrated in the schematic diagram of FIG. 5, decoders 44A and 44B each produce four binary level enable signals, namely read data register enable signal $E_{RDR}$, write data register enable signal $E_{WDR}$, RAM write enable signal $E_{RWE}$, and RAM read enable signal $E_{RRE}$. As shown, read data register enable signal $E_{RDR}$ from decoder 44A is provided to the "load enable" input of host read data register 21A, whereas write data register enable signal $E_{WDR}$ from decoder 44A is provided to the "output enable" input of host write data register 22A. RAM write enable signal $E_{RWE}$ from decode 44A is provided to a first input of OR gate 45A, whereas RAM read enable signal $E_{RRE}$ from decoder 44A is provided to a first input of OR gate 45B. Similarly, read data register enable signal $E_{RDR}$ from decoder 44B is provided to the "load enable" input of read data register 21B, whereas write data enable signal $E_{WDR}$ from decoder 44B is provided to the "output enable" input of MAC write data register 22B. RAM write enable signal $E_{RWE}$ from decoder 44B is provided to a second input of OR gate 45A, whereas RAM read enable signal $E_{RRE}$ from decoder 44B is provided to a second input of OR gate 45B. The outputs of OR gates 45A and 45B, in turn, are provided to write and read enable inputs, respectively, of RAM buffer memory 6.

As shown in FIG. 5, RAM address bus 24A is provided to a first set of inputs of address multiplexer 46, whereas RAM address bus 24B is provided to a second set of inputs of address multiplexer 46. Address bus 24A is normally passed through multiplexer 46 and onto the address inputs of RAM buffer memory 6. In order to connect address bus 24B to the address inputs of RAM buffer memory 6, enable signal $E_{BADD}=C_{1B}$ from timing control signal generator 42B is provided to the control input of multiplexer 46, as shown. Thus, when $C_{1B}=1$ during MAC initiated memory access cycles, address bus 24B will be automatically connected to the address inputs of RAM buffer memory 6. Taken together, enable signals $E_{RRE}$, $E_{RWE}$ and $E_{RAM}$ comprise control bus 25 illustrated in FIG. 4.

As illustrated in FIGS. 7A and 7B, the actual binary levels that each of the four enable signals $E_{RDR}$, $E_{WDR}$, $E_{RWE}$ and $E_{RRE}$ take on during each of the four time intervals $T_1$, $T_2$, $T_3$, $T_4$ of each RAM write and read cycle, depend on the status (i.e. binary value) of the timing control signals $C_1$ and $C_2$ and the read/write request signal R/W during time intervals $T_1$, $T_2$, $T_3$ and $T_4$. For simplicity, the designations "A" and "B" are omitted.

The structure and function of the synchronous memory access control unit of the illustrative embodiment has been described in detail above. It is now proper at this juncture to describe its operation during each of the four possible RAM access cycles synchronously executed by the memory access control unit when write and/or read cycle requests are made at port interface unit 15 by the host processor and at port interface unit 16 by the medium access control unit.

Figure 8A:
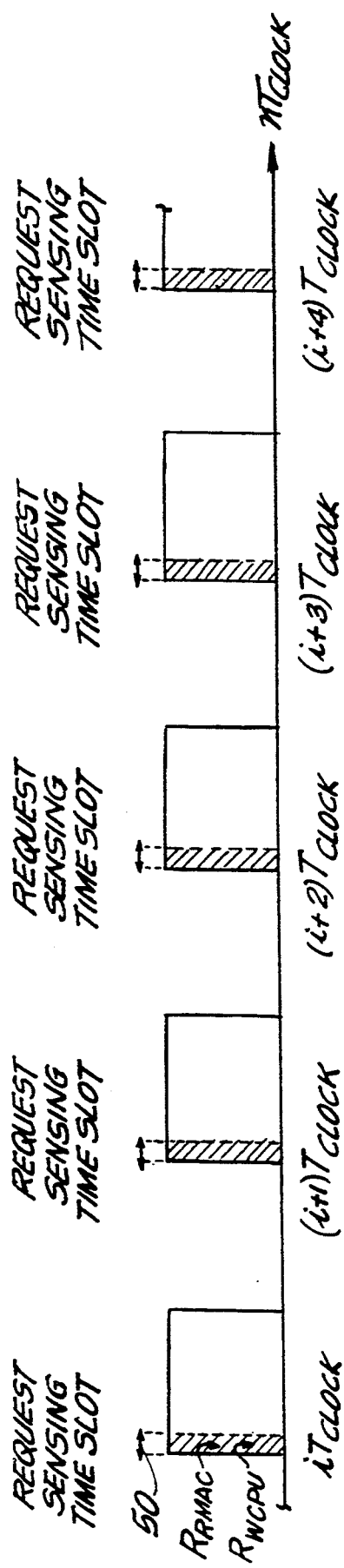
FIGS. 8A and 8B represent a schematic representation showing a plurality of consecutive clock pulse time intervals elapsing during operation of the memory access control unit of the present invention, and the location of time slots created within the sequential controller for sensing the presence of memory access cycle requests by both the host processor and medium access control unit.
Figure 8B:
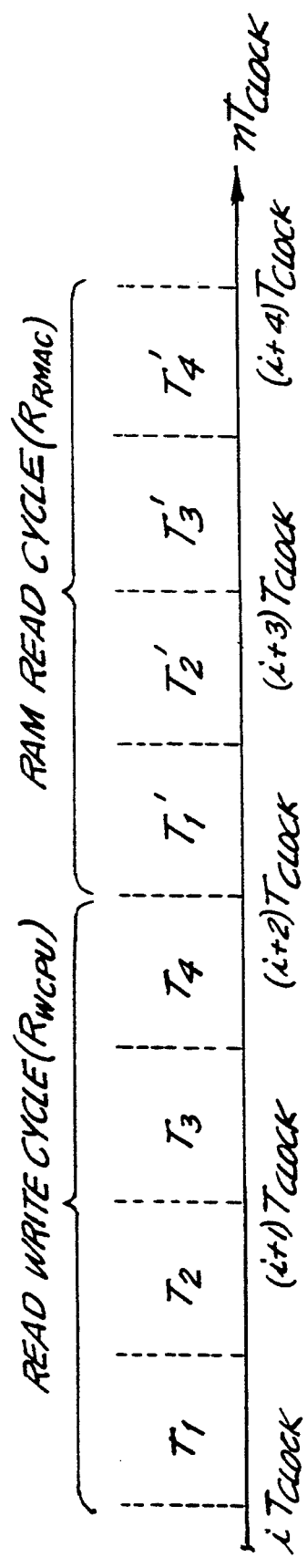

For purposes of exposition, it is best to describe how the memory access control unit operates when the host processor and the medium access control unit have both simultaneously placed memory access requests to control unit 3 during the same time-slot created by time-slot synchronizers 39A and 39B. As illustrated in FIG. 8A, periodic clock pulse intervals of length $T_{clock}$ are created one after the other by clock 18. However, in the illustrated embodiment, time-slots for request sensing (e.g. sampling) are created only at the beginning of each new clock pulse interval, as shown. While these time slots or windows have been selected to be relatively short in the illustrative embodiment and involve arbitration request logic 38 making two samples of the output of OR gates 40A and 40B, the time windows may be of longer extent in other embodiments. What is important to note for the particular illustrated embodiment, is that only the completion of both address pointer writing and data byte writing will constitute an arbitration request for requested RAM write cycles, while merely completion of address pointer writing will constitute an arbitration request for requested RAM read cycles. For the purposes of illustration, the situation where a RAM write cycle request is made by the host processor and a RAM read read cycle request is made by the medium access control unit, will be considered below. Initially, all request storage registers are reset (i.e. cleared).

For the host processor to place a RAM write cycle request during a particular time slot, for example, as indicated at 50 in FIG. 8A, the host processor must previous to this time slot, place RAM address and control bits $B_1$ and $B_2$ onto data bus 7 for a sufficient set up time, and then strobe write pointer enable line $H_{WPE}$. For purposes of illustration, automatic address increment mode is selected by setting control bit $B_1=1$, and the write cycle mode is selected by setting read mode control bit $B_2=0$. The data bus 7 is kept stable for a sufficient hold-time period so as to write the RAM address and selected control bits into pointer register/counter unit 20A, as hereinbefore described. Notably, these operations do not set the RAM read cycle request flag in read request storage element 29A, as data byte prefetching (i.e. preloading) by sequential controller 17 is not necessary during a RAM write cycle. Notably, however, strobing the write pointer enable line $H_{WPE}$ causes the address pointer latch 27A to open, permitting the host processor to read the address loaded into address pointer register 34A.

After waiting at least the minimal port access time $T_{port\ access}$ (i.e. $\geq 2 \cdot T_{mem\ access\ cycle}$), the host processor returns to the CPU port interface unit and writes the corresponding data byte into host write data register 22A. This is achieved by placing the data byte bits onto data bus 7 for a sufficient set-up time, strobing the write data enable line $H_{WDE}$, and maintaining the data bus stable for a hold-time sufficient to effect the writing of the data byte bits into register 22A. Notably, the strobing action on line $H_{WDE}$ causes, at this time, a RAM write request cycle flag to be set within write request storage element 28A. In turn, request storage register 41A is reset to retain write cycle request $R_{WCPU}$, while the output of OR gate 40A indicates that a memory access cycle request has been made by the host processor. If at this time only the host processor has written a RAM write request, then at time-slot 50 request arbitration logic 38 will sense this request and commence execution of a RAM write cycle as described above.

Now it is assumed for purposes of illustration that the medium access control unit makes a complete request at time slot 50 to read a data byte out of RAM buffer memory 6. This would be achieved as follows. First, the medium access control unit places RAM address and control bits $B_1$ and $B_2$ onto data bus 10 for a sufficient set-up time, and then strobes write pointer enable line $M_{WPE}$. For purposes of illustration, the automatic address increment mode is selected by setting control bit $B_1=1$ and the read cycle mode is selected by setting read mode control bit $B_2=1$. Data bus 10 is kept stable for a sufficient hold-time period so as to write the RAM address and selected control bits into pointer register/counter unit 20B, as hereinbefore described. Notably, the operation of strobing write pointer enable line $M_{WPE}$ causes a read request flag $R_{RMAC}$ to be set in read request storage element 29B, as read mode enable signal $E_{Rmode}$ to the input of AND gate 30B is a logical "1". At the same time, strobing line $M_{WPE}$ causes address pointer latch 27B to open, permitting the medium access control unit to read the address loaded into RAM address pointer register 34B.

If after the occurrence of the above-described asynchronous events, a RAM read cycle request flag $R_{RMAC}$ and a RAM write cycle request flag $R_{WCPU}$ are both set in request storage elements 29B and 28A during time slot 50 illustrated in FIG. 8A, the synchronous memory access control unit processes these simultaneous memory access requests as follows.

As indicated at block A of FIG. 6, all memory access requests are initially cleared from storage registers 28A, 28B, 29A and 29B. As indicated in FIG. 7B, resetting of request flags by flag reset signal $E_{FRESETB}$ occurs during the transition from time interval $T_1$ to $T_2$ in each executed memory access cycle. Then, as indicated at block B in FIG. 6, request arbitration logic 38 senses the output of OR gates 40A and 40B and determines whether any memory access requests have been made during time slot 50, schematically illustrated in FIG. 8A. Then as indicated at block C, request arbitration logic 38 determines whether the request is solely from the host processor, (i.e. CPU) or from both the host processor and the medium access control unit.

If requests are made by both the host processor and the medium access control unit or simply the host processor, then as indicated at block D in FIG. 6, the contents of request storage register 41A are anaylzed by decoder 44A in order to determine whether a RAM read cycle request $R_{RCPU}$ or a RAM write cycle request $R_{WCPU}$ has been made during time slot 50. Arbitration logic 38 and clock 18, cooperatively cause timing signal control generator 42A to produce timing control signals ($C_{1A}$ and $C_{2A}$, e.g.) over the next four clock half cycles (i.e. $2 \cdot T_{clock}$). The timing control signals and read/write signal $R/W_A$, in turn, cause decoder 44A to generate enable signals that effect a RAM write cycle to occur during time intervals $T_1$ through $T_4$, illustrated in FIG. 8B. The particular binary values of the various signals produced during this memory write cycle are summarized in FIG. 7B. Notably, after the first time interval $T_1$, automatic address increment signal $E_{AINCA}$ is set to logical "0" to cause the next consecutive address value to be written into address pointer register 34A while closing address pointer register 27A during time intervals $T_2$, $T_3$ and $T_4$.

If, however, RAM read cycle request $R_{RCPU}$ was made by the host processor instead of request $R_{WCPU}$, a RAM read request cycle would have been carried out by the sequential controller, resulting in the prefetching of the addressed data byte from RAM buffer memory 6. Thereafter, as indicated at block G in FIG. 6 request flags set in request storage elements 28A and 29A are cleared. At block H, arbitration request logic 38 determines whether a memory access cycle request was made by the medium access control unit during time slot 50. If not, then the sequential controller returns to block B, as shown. If, however, a request was made by the medium access control unit during time slot 50, then the sequential controller proceeds to block I. Notably, advancement to block I could have also occurred at block C upon an initial indication that only a request was made by the medium access control unit during time slot 50.

As indicated at block C in FIG. 6, arbitration request logic 38 determines whether a RAM read cycle request $R_{RMAC}$ or a RAM write cycle request $R_{WMAC}$ has been made during time slot 50. Arbitration logic 38 and clock 18 cause timing signal control generator 42B to produce timing control signals ($C_{1B}$ and $C_{2B}$, e.g.) over the next four clock half cycles (i.e. $2 \cdot T_{clock}$). Control signals and read/write signal R/W$_B$, in turn, cause decoder 44B to generate enable signals that effect a RAM read cycle to occur during time intervals $T_1'$ through $T_4'$, illustrated in FIG. 8B. The particular binary values of the various signals during this memory read cycle are summarized in FIG. 7B. Notably, after the first time interval $T_1'$, auto address increment signal $E_{AINCB}$ is set to logical "0" to cause the next consecutive address value to be written into address pointer register 34B, while closing address pointer latch 27B during time intervals $T_2'$, $T_3'$ and $T_4'$. In this way, the previous address stored in latch 27B can be read by the medium access control unit if desired. Address pointer latch 27B will not be opened until a subsequent data byte preloaded into MAC read data register 21B, is read from. This latch opening operation allows loading of the address pointer of the (preloaded) read data byte, into pointer latch 27B. The reading of the prefetched (i.e. preloaded) data byte initiates a subsequent data byte preloading operation, during which the pointer latch will close and the address pointer will increment, as described above. Consequently, a data byte read from read data register 21A or 21B by either the host processor or the medium access control unit, respectively, will have been fetched from a RAM storage location specified by the address previously read, and not the current address pointer value which is one address increment greater, to indicate the next byte to be prefetched.

If, however, a RAM write cycle request $R_{WMAC}$ was made by the medium access control unit instead of request $R_{RMAC}$, then as indicated at block K, a RAM write cycle would have been carried out by the sequential controller, resulting in the writing of data into RAM buffer memory 6. Then, as indicated at block L, request flags set in request storage elements 28B and 29B are cleared. Thereafter, the sequential controller returns to block B, as shown in FIG. 6.

After the RAM read cycle has been executed, the host processor and the medium access control unit are free to make subsequent write and read cycle requests, respectively, having both previously set automatic address increment bit $B_1$ during the address pointer writing operations associated with simultaneous requests placed during time slot 50. Notably, both the host processor and medium access control unit are free to initiate RAM read and write cycles respectively at any time thereafter, as long as neither party violates the access time constraint: $T_{ACC} \geq 2\, T_{mem\ cycle\ access}$. In any event, memory access requests detected during the time slot at the beginning of each new clock pulse interval, will be processed in general accordance with the control process illustrated in FIG. 6.

While the particular illustrative embodiment shown and described above will be useful in many applications in communication controller art, further modifications to the present invention herein disclosed will occur to persons skilled in the art. All such modifications are deemed to be within the scope and spirit of the present invention defined by the appended claims.

What is claimed is:

1. A data communication controller fabricated on a semiconductor chip, comprising:
   first connection means for connecting said data communication controller to a system bus operably connected to a host processor;
   second connection means for connecting said data communication controller to a communication medium;
   a medium access control unit, operably connected to said second connection means, for controlling access of said data communication controller to said communication medium;
   a memory access control unit providing said host processor and said medium access control unit synchronous access to a single-port common buffer memory having a plurality of data byte storage locations, said memory access control unit including
   a first access port including
      a first address pointer register for storing an address specifying a storage location in said buffer memory,
      a first read data register for storing a data byte readable by said host processor,
      a first write data register for storing a data byte written therein by said host processor,
      a first request storage means for storing memory read or write cycle requests placed by said host processor, and
      first address incrementation means for automatically incrementing an address written into said first address pointer register by said host processor, in automatic response to the execution of each memory read cycle request or each said memory write cycle request, and
   a second access port including
      a second address pointer register for storing an address specifying a storage location in said buffer memory,
      a second read data register for storing a data byte readable by said medium access control unit,
      a second write data register for storing a data byte written therein by said medium access control unit,
      a second request storage means for storing memory read or write cycle requests placed by said medium access control unit, and
      second address incrementation means for automatically incrementing an address written into said second address pointer register by said second medium access control unit, in response to the execution of each memory read cycle request or each memory write cycle request; and
   a synchronous controller operably coupled to said first and second access ports and said single-port common buffer memory, and having
      means for executing said memory read and write cycle requests,
      means for transferring data bytes between said first read data register and said single-port common buffer memory and between said first write data register and said single-port common buffer memory, and
      means for transferring data bytes between said second read data register and said single-port common buffer memory and between said second write data register and said single-port common buffer memory, said synchronous controller further including
         first means for automatically detecting a memory read cycle request placed in said first request storage means by said host processor, and in response to the detection of a memory read cycle request, automatically reading the data byte storage location of said single-port common buffer memory specified by the address stored in said first address pointer register so as to retrieve a first data byte therefrom, and loading said first data byte into said first read data register, second means for automatically detecting a memory read cycle request placed in said second request storage means by said medium access control unit, and in response to the detection of said memory read cycle request, automatically reading the data byte storage location of said buffer memory specified by the address stored in said second address pointer register, so as to retrieve a second data byte therefrom, and loading said second data byte into said second read data register, third means for automatically detecting a memory write cycle request placed in said first request storage means by said host processor, and in response to the detection of a memory write cycle request, automatically accessing said first write data register to access a third data byte stored therein, and writing said third data byte into the data byte storage location in said single-port common buffer memory specified by the address stored in said first address pointer register, and fourth means for automatically detecting a memory write cycle request placed in said second request storage means by said medium access control unit, and in response to the detection of a memory write cycle request, automatically accessing said second write data register to access a fourth data byte stored therein, and writing said fourth data byte into the data byte storage location in said single-port common buffer memory specified by the address stored in said second address pointer register.

2. The data communication controller of claim 1,
wherein said first access port further comprises
means for retaining, for at least one memory read or write cycle, each previous address which said first address incrementation means increments in said first address pointer register, and
wherein said second access port further comprises
means for retaining, for at least one memory read or write cycle, each previous address which said second address incrementation means increments in said second address pointer register.

3. The data communicator controller of claim 1, wherein said synchronous controller comprises timing means for creating periodic time slots, during which said synchronous controller automatically detects the memory read or write cycle requests stored in said first and second request storage means.

* * * * *